July 31, 1951 R. W. JONES 2,562,555

AUTOMATIC TELEPHONE SYSTEM

Filed Feb. 24, 1948 3 Sheets-Sheet 1

INVENTOR.
ROY W. JONES

BY
Winfred T. Powell
ATTORNEY

*INVENTOR.*
ROY W. JONES

*BY* Winfred T. Powell

ATTORNEY

INVENTOR.
ROY W. JONES
BY
Winfred T. Powell
ATTORNEY

Patented July 31, 1951

2,562,555

UNITED STATES PATENT OFFICE 2,562,555

AUTOMATIC TELEPHONE SYSTEM

Roy W. Jones, Rochester, N. Y., assignor to Stromberg-Carlson Company, a corporation of New York Application February 24, 1948, Serial No. 10,263

6 Claims. (Cl. 179—17)

Figure 1:
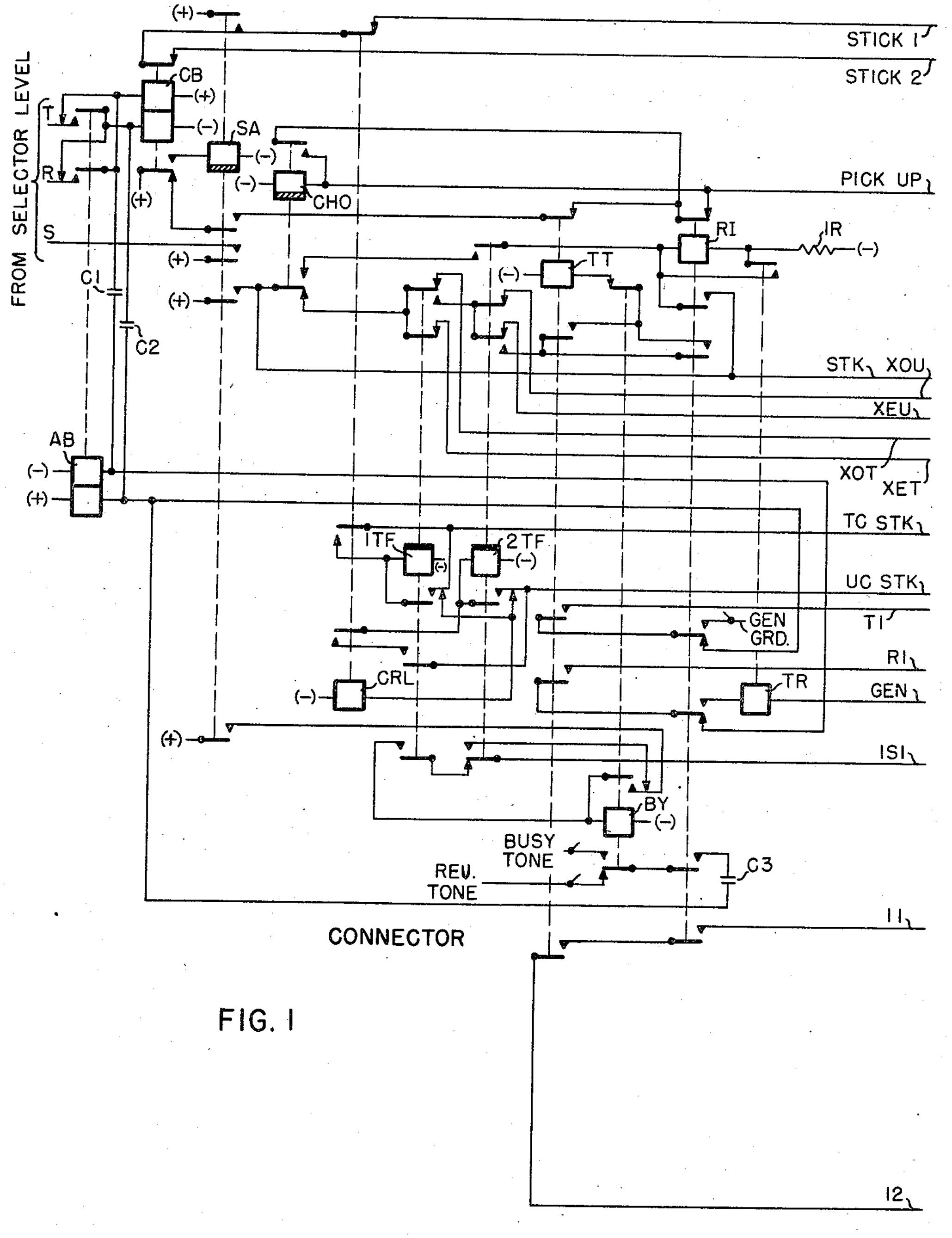

This invention relates to telephone systems and it more particularly applies to special service in such systems, such as intercepting service.

An object of the invention is to provide an improved economically arranged ringing, signaling and tripping arrangement for intercepting equipment.

In previous automatic telephone systems arranged for intercept service, calls for lines changd or disconnected are extended to terminals connected to a trunk leading to intercepting apparatus. In such systems, in case of an intercepting trunk circuit, the ringing is usually tripped by the application of a ground or battery potential on one of the line conductors for operating the usual trip relay in the connector used for setting up the connection.

It is one object of the present invention to provide, in an automatic telephone system of the all-relay type, improved apparatus of simple construction which operates in a new and improved manner to intercept calls to a substation associated with an individual line or a party line, to trip the ringing applied to such a line without the above mentioned application of ground or battery, and for applying an intercept tone to the calling party as an indication that the called station cannot be reached and that the calling party should hang up the receiver and dial the information operator for further information in connection with the desired station.

It is a further object of the present invention to provide an improved circuit arrangement of the character described, wherein the apparatus connected to an intercepted line circuit is reduced to a minimum, with the complicated portion of the circuit being in a group common to a plurality of intercept line circuits.

Still a further object of the present invention is the provision of a circuit arrangement whereby marking potentials are applied from the connector used in selecting the called line, in accordance with the setting of the station selecting apparatus in the connector for effectively operating the common intercepting equipment to trip the ring and to apply the intercept tone, without depending on any ringing signal applied to the called line. More specifically, in the present invention the recording of the station digit in the connector extends a marking potential by way of individual contacts selected by the station selector, the selected marked terminal is cross connected to a terminal associated with the intercept line circuit and the intercepting apparatus will function to trip the ring and apply the intercept tone regardless of the actual ringing signal applied to the called line, if the called station is on intercept.

Figure 2:
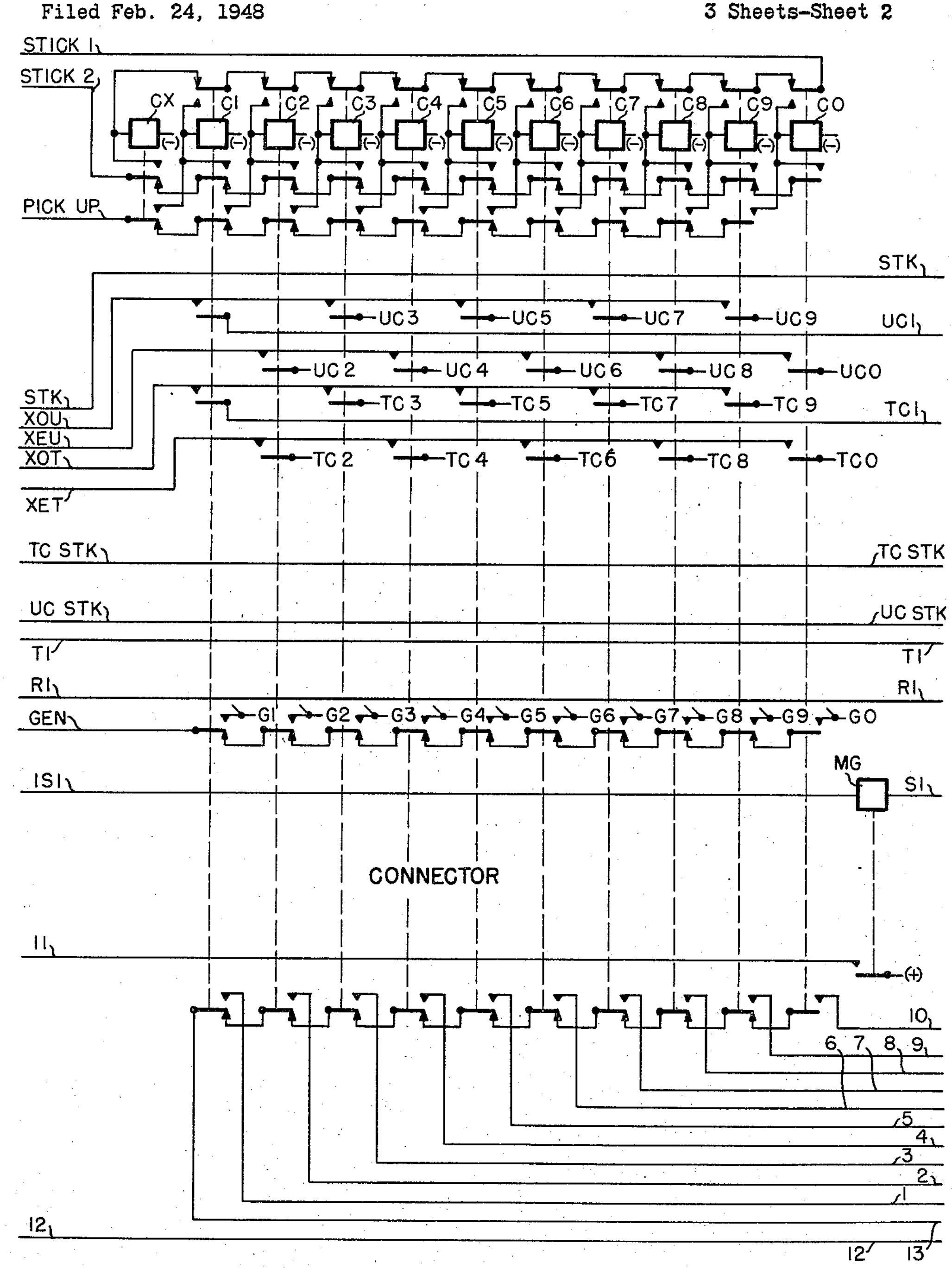
Figure 3:
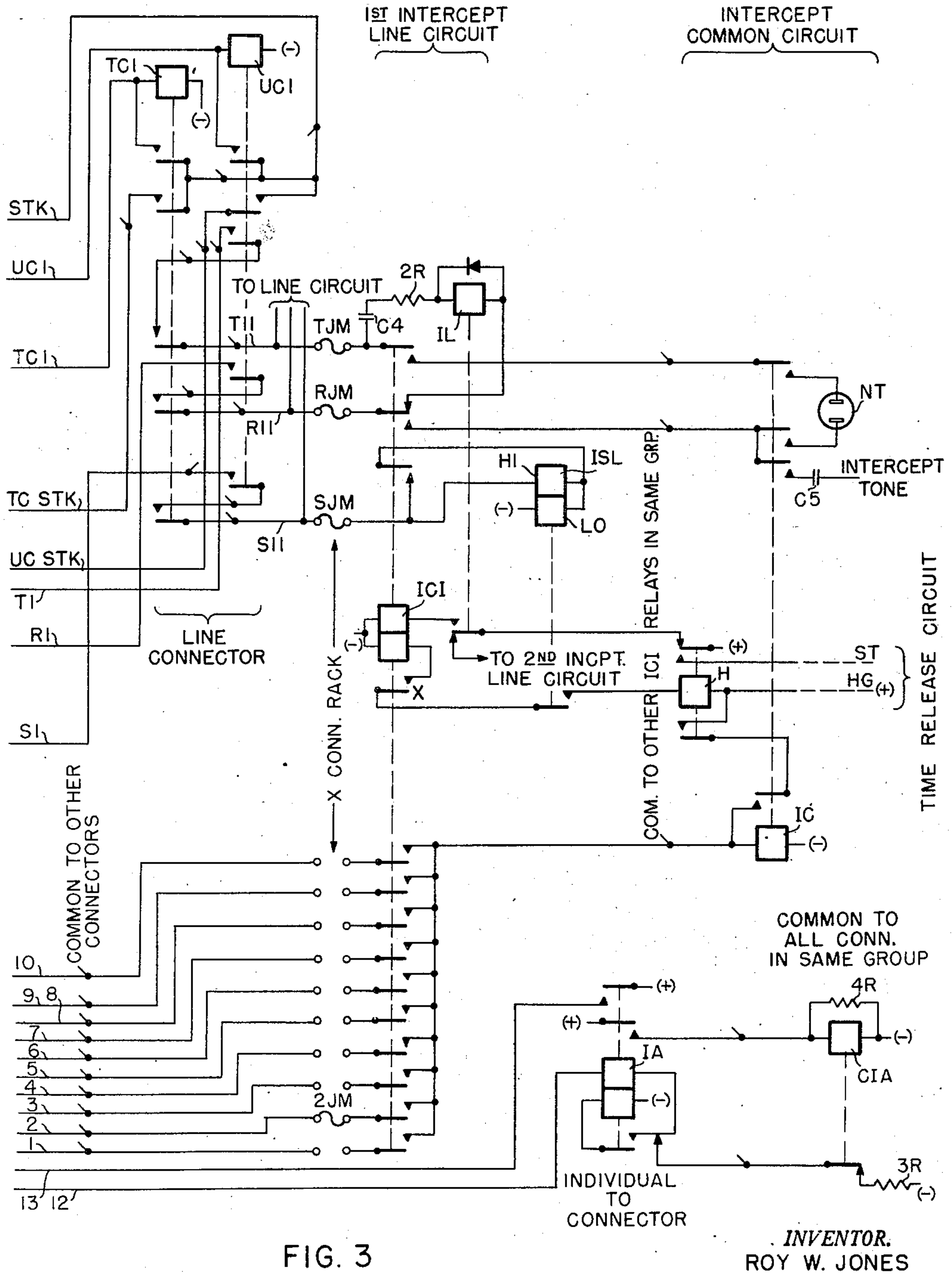

The novel features believed to be characteristic of the invention are set forth in the appended claims. The invention, both as to its organization and method of operation, together with further objects and advantages thereof will be best understood by referring to the following specification taken in connection with the accompanying drawings in which:

Figs. 1, 2 and 3 when placed in the order named and with correspondingly identified lines in alignment, illustrate an intercept circuit arrangement having embodied therein the features of the invention briefly outlined above.

The various units of an automatic telephone system are indicated in the drawings, that is, Figs. 1 and 2 show the control relays of a connector link of the all-relay type, the left-hand portion of Fig. 3 illustrate the line connecting relays associated with the connector link and the remaining portion of Fig. 3 illustrates the various intercept circuits as labeled.

For the purpose of simplifying the drawings and facilitating the explanation, the various parts and circuits constituting the embodiment of the invention have been shown diagrammatically and certain conventional illustrations have been employed, the drawings having been made more with the purpose of making it easy to understand the principles and mode of operation than with the idea of illustrating the specific construction and arrangement of parts that would be actually used in practice. For example, the various relays and their contacts are illustrated in a conventional manner, with all of the contacts controlled by a particular relay being associated with this relay by means of a dashed line. The negative side of the common exchange battery is indicated by (—) and the positive side of the exchange battery, which is usually grounded, is indicated by (+).

For convenience in illustrating and describing the features of the present invention, it is assumed that it is applied to a party line telephone system of the code ringing type and that the code ringing arrangement is such as to provide for a maximum of ten stations on a party line.

In the embodiment of the invention illustrated in the drawings, it is assumed that a line circuit, finder and selector are used to extend the calling line to the tip, ring and sleeve conductors T, R and S shown in the upper left hand portion of Fig. 1, when a call is initiated on the calling line. The line, finder and selector circuits, while not illustrated, may be of the all-relay type and the same as those shown in Powell Patent 2,325,877, issued August 3, 1943.

In order to simplify the drawings, most of the circuit elements for providing special features in an all-relay type system have been eliminated, such as time release, reverting calls, switching through connector operations, etc. The T, R and S conductors shown in the upper left hand portion of Fig. 1 may correspond to conductors 86, 87 and 88 respectively of the above mentioned Patent 2,325,877.

In connection with the sources of ringing current, common conductors having reference characters G1 to G0 inclusive are shown connected to make contacts of counting relays C1 to C0 inclusive and it will be understood that these may extend to common sources of generator current. Each of these sources may be coded to provide code ringing or half of them could be sources of harmonic ringing current of 1 ring, while the other half could be the same sources of harmonic ringing current of 2 rings per cycle. The usual spark suppressors provided in circuits of this type are omitted from the present drawings, since it is well known how these spark quenchers may be connected in accordance with conventional practice.

It is believed that the invention will be best understood by explaining in detail the circuit operation when a connection is established from a calling substation connected to conductors T and R in the upper left hand portion of Fig. 1 in response to a call for a station which normally responds to the code ring selected by the station selecting circuit of the connector.

After this portion of the operation is explained, it will then be assumed that the station corresponding to this code ring is not in service as indicated by the cross connection of code jumper 2JM shown in the lower portion of Fig. 3. It will be understood that the cross connection jumper may connect across any one of the 10 sets of terminals for effectively marking any one of the 10 stations of a party line as one to have its calls intercepted.

When the connector is seized, the closed circuit across the calling line operates calling bridge relay CB over a circuit extending from (+), upper winding of relay CB, break contact of answering bridge relay AB, trip conductor T, over the selector, finder and calling line circuits returning by way of conductor R, break contact of relay AB and lower winding of relay CB to (−). The operation of relay CB closes an obvious circuit for operating slow acting relay SA and this relay in turn applies (+) potential to sleeve conductor S for holding the selector, finder and line circuit relays in accordance with conventional practice. The operation of relay SA closes a circuit for operating the first counting relay CX extending from (+), make contact of relay SA, break contact of counter release relay CRL, conductor stick 1, break contacts in series of counting relays C0 to C1 inclusive and winding of relay CX to (−).

No dial tone connections are shown, since it is assumed that this particular connection is operating in a selector type system, consequently the dial tone will be provided from the selector (not shown).

It will now be assumed that the calling party dials 112 for selecting station 2 on line 11 and it will be first assumed that calls to this particular station on this particular line are not to be intercepted. When relay CB is released at the beginning of the transmission of the first impulse of the tens digit, relay CX is locked operated over a circuit extending from (+), make contact of relay SA, break contact of relay CB, conductor stick 2, make contact and winding of relay CX to (−). At this time a circuit is closed for operating the first counting relay C1 extending from (+), break contact of relay CB, make contact of relay SA, break contact of test relay TT, break contact of ringing relay RI, pickup conductor, make contact of relay CX and winding of relay C1 to (−). The operation of relay C1 opens up the above described operating circuit for relay CX but this latter relay is now held by the above described locking circuit. Relay C1 closes a locking circuit for itself extending from (+), make contact of relay SA, break contact of relay CRL, break contacts in series of relays C0 to C2 inclusive and make contact of relay C1 to (−). The (+) potential applied to the pickup conductor is extended to the winding of change over relay CHO for operating this relay at the beginning of the impulse transmission.

When relay CB operates at the end of the first impulse, the above described stick 2 conductor is de-energized for effecting the release of relay CX. Since this is the end of the impulse transmission for the tens digit, the pickup conductor is not again energized, with the result that no other counting relays are operated and relay CHO is released. Since number 1 is the tens digit, a circuit is closed for operating the selected tens connecting relay (TC1 in this example), this circuit extending from (+), make contact of relay SA, break contact of relay CHO, break contact of the first transfer relay 1TF, odd tens executing conductor XOT, make contact of relay C1, conductor TC1 and winding of relay TC1 to (−). Relay TC1 closes a locking circuit for itself extending from (+), make contact of relay SA, stick conductor STK, make contact and winding of relay TC1 to (−). Counter release relay CRL is now operated over a circuit extending from (+) on conductor STK, make contact of relay TC1, tens stick conductor TCSTK, break contact of relay 1TF and winding of relay CRL to (−). The operation of relay CRL extends the (+) on conductor TCSTK to the winding of relay 1TF for operating this relay which closes a locking circuit for itself directly to conductor TCSTK. The operation of relay 1TF opens up and releases relay CRL. During the interval that relay CRL is operated, conductor stick 1 is opened for effecting the release of relay C1. When relay CRL releases, conductor stick 1 is again energized for operating relay CX to prepare the counting relays for the next or units digit.

The release of relay CB at the beginning of the transmission of the first impulse of the units digit closes the above described circuit for locking relay CX, operating relay CHO, operating and locking relay C1. When relay CB operates at the end of this impulse transmission, relay CX is released as before and, after a short time interval, relay CHO is again released. The release of relay CHO closes a circuit for operating the selected units connecting relay, in this example relay UC1, this circuit extending from (+), make contact of relay SA, break contact of relay CHO, make contact of relay 1TF, break contact of the second transfer relay 2TF, odd units executing conductor XOU, make contact of relay C1, conductor UC1 and winding of relay UC1 to (−). Relay UC1 closes a locking circuit for itself extending to (+) on conductor STK and this conductor is now connected to units stick conductor UCSTK for extending this circuit from (+) back through a break contact of relay 2TF to the winding of relay CRL for operating this latter relay. Relay CRL extends the (+) on conductor UCSTK, by way of a make contact of relay 1TF, to the winding of relay 2TF for operating and locking this latter relay directly to conductor UCSTK. Relay CRL is again opened up and released and during the interval that relay CRL is operated counting relay C1 is released and when relay CRL releases relay CX is again operated for preparing the counting relays for the next or station digit.

Although only one TC relay and one UC relay are shown, it is obvious that additional TC and UC relays are actually provided in the line connector and selectively operated when other tens and units digits are dialed as indicated by the reference characters TC2 to TC0 inclusive and UC2 to UC0 inclusive associated with contacts of the counting relays. Since this portion of a relay type connector is made up in accordance with conventional practice, it is not believed necessary to complicate the drawings by adding other connecting relays.

When relay UC1 is operated and before relay 2TF is operated, a test is made of the called line to determine if it is busy or idle. If the called line is busy, the connection to (+) on sleeve conductor S11 will be extended back through make contacts of relays TC1 and UC1, conductor S1, marginal relay MG, conductor 1S1, break contact of relay 2TF, make contact of relay 1TF and winding of relay BY to (—). The (+) potential from the sleeve conductor of a called busy line will operate relay BY and this relay will lock itself to (+) at the make contact of relay SA, apply busy tone to the calling line by way of a make contact of relay RI (operated as will next be described) and it will open up the winding of test relay TT to prevent the operation of this relay and the cut in on a busy line.

Assuming the called line to be idle, relay BY is not operated and when relay 2TF is operated a circuit is closed from (+), make contact of relay SA, break contact of busy relay BY, make contact of relay 2TF, conductor 1S1, winding of relay MG, conductor S1, make contacts of relays UC1 and TC1 in series and sleeve conductor S11 to the cut off relay of the called line. This connection of (+) on sleeve conductor S11 makes this line busy to other calls and operates the called line cut off relay.

When the dial is next operated to transmit the station digit, the first release of relay CB again locks relay CX and operates and locks relay C1 at the same time that relay CHO is operated. The operation of relay CHO at the beginning of the station digit closes a circuit for operating ringing relay RI extending from (+), make contact of relay SA, make contact of relay CHO, make contact of relay 2TF, winding of relay RI and resistor 1R to (—). Relay RI closes a locking circuit for itself from (+), make contact of relay SA, make contact of relay RI, winding of relay RI and resistor 1R to (—).

When relay CB operates at the end of the first impulse, relay CX is released as before but relay CHO is not released because another impulse will immediately follow. The original operating circuit for relay CHO is opened at the break contact of relay RI, but a substitute circuit for relay CHO is completed at its own make contact in parallel with the break contact of relay RI to prevent the release of relay CHO until the end of the station digit transmission. When relay CHO is released at the end of the station digit it cannot be again operated and the counting relays cannot be operated in the event that the dial should be again turned. This is because the pickup circuit is open at a break contact of relay RI and at a break contact of relay TT, this latter relay being operated at the end of the station digit transmission.

When relay CB is released at the beginning of the second impulse of the station digit, relay C1 is locked operated over a circuit extending from (+), make contact of relay SA, break contact of relay CB, conductor stick 2, break contact of relay CX, make contact and winding of relay C1 to (—). Relay C2 is now operated over a circuit extending from (+), break contact of relay CB, make contact of relay SA, break contact of relay TT, make contact of relay CHO, pickup conductor, break contact of relay CX, make contact of relay C1 and winding of relay C2 to (—). (+) on conductor stick 1 is now connected to the winding of relay C2 for locking this relay in its operated position. Since relay CB is operated at the end of the second impulse, relay C1 will be released because conductor stick 2 is now deenergized and since this is the end of the station digit impulse transmission, relay CHO will release. A circuit is now closed for operating test relay TT extending from (+), make contact of relay SA, break contact of relay CHO, make contact of relay 1TF, make contact of relay 2TF, make contact of relay RI, break contact of relay BY and winding of relay TT to (—). Relay TT locks itself operated by way of its make contact which closes a shunt path across the make contact of relay RI. The calling line is now rung and the reverting ringing tone is connected to the calling line over a circuit extending from the reverting ringing tone source, break contact of relay BY, make contact of relay RI, condensers C2, C3 and over the calling line circuit. The called station is rung over a circuit extending from the #2 generator source G2, make contact of relay C2, break contact of relay C1, conductor GEN, winding of relay TR, make contact of relay RI, make contact of relay TT, conductor R1, make contacts of relays UC1 and TC1, conductor R11, over the called line, conductor T11, make contacts of relays UC1 and TC1, conductor T1, make contact of relay TT and make contact of relay RI to the grounded generator common. It will be obvious how other sources of ringing current are selected by the operation of any one of the other 9 counting relays in response to the dialing of any one of the other 9 station digits. This is indicated by the reference characters G1 to G0 inclusive which show the common sources of ringing current, which for example, may be generator signaling currents of 10 different codes.

When the called party answers, the closed circuit across the called line operates relay TR for short circuiting and releasing relay RI after which relay TR is opened up and released. The release of relay RI extends the called line conductors back to relay AB and this relay is operated over the called line circuit for reversing the current back to the calling line for supervisory or metering purposes. The talking circuit is now completed with battery being fed to the called line through the windings of relay AB and with battery being fed to the calling line through the windings of relay CB, with these two lines being connected in a conversational circuit by way of talking condensers C1 and C2.

When the called party hangs up, relay AB is released to straighten out the battery connection to the calling line for supervisory purposes. When the calling party hangs up, relay CB is released for effecting the release of relay SA. The release of relay SA disconnects (+) from the circuits which are holding relays C2, TC1, 1TF, UC1, 2TF, TT and the cut off relay of the called line, thus effecting the release of these relays. The release of relay SA also disconnects (+) from sleeve conductors extending back to the originating end of the connection for effecting the release of the selector, finder and calling line circuit. This places the circuits in normal condition ready for use on another call.

It will now be explained how the circuits function when a station is called which is connected for intercept.

It will now be assumed that, since the call to the called sub-station above described was put through, this station has been removed and placed on intercept by connecting jumpers TJM, RJM and SJM at the connecting rack between the first intercept line circuit and the tip, ring and sleeve conductors T11, R11 and S11 of the called line circuit. It will further be assumed that jumper 2JM is connected from the first intercept line circuit to the #2 marking conductor extending to all connectors having access to this line circuit, as indicated in Fig. 3. The relays operated in connection with this call will be the same as previously described up to the point where the first ringing signal is transmitted to the called line. This means that relays CB, SA, C2, TC1, 1TF, UC1, 2TF, RI, TT and cut off relay of the called line will be in their operated positions. Since relay RI is operated, the reverting ringing tone will be connected to the calling line in the manner previously described.

When the first ringing voltage is applied to the called line, relay IL of the intercept line circuit now connected to this line will be operated over a circuit extending from the generator source selected (in this example generator G2), make contact of relay C2, break contact of relay C1, conductor GEN, winding of trip relay TR, make contact of ringing relay RI, make contact of relay TT, conductor R1, make contact of units connector relay UC1, make contact of tens connector relay TC1, called line ring conductor R11, jumper RJM, break contact of intercept cut in relay ICI, winding of intercept line relay IL (being bridged by the rectifier to make this relay hold steady on alternating ringing current), resistor 2R, condenser C4, jumper TJM, called line tip conductor T11, make contact of relay TC1, make contact of relay UC1, conductor T1, make contact of relay TT and make contact of relay RI to the return side of the generator circuits GEN, GRD. It will be understood that the ringing current of this first portion of the code will be applied to the called line, in the previously described manner, but since a call to an intercept station will immediately trip the ring and stop the application of ringing current to the called line, this short ring will not signal any station on the line, it being assumed that there is no station on the line responsive to one short ring.

The operation of relay IL closes a circuit for operating intercept cut in relay ICI extending from (+), break contact of hold relay H, make contact of relay IL and upper winding of relay ICI to (−). Relay ICI closes a locking circuit for itself extending from (+) on hold conductor HG, winding of relay H, make contact of intercept sleeve relay ISL (operated as will be next described), X make contact of relay ICI, and lower winding of relay ICI to (−). The contact X makes first to provide a locking and strong operating circuit for relay ICI before the operating circuit including the upper winding of this relay is opened by the release of relay IL, this latter relay being released when relay ICI operates and opens its break contact.

When sleeve conductor S1 is energized for operating the cut off relay of the called line, as previously described, this energized sleeve conductor is extended through jumper SJM and both windings of relay ISL to (−). Since the upper winding of relay ISL is of a high resistance, 10,000 ohms for example, relay MG of the connector will not operate in series with this winding, but relay ISL operates. The operation of relay ISL prepares the above described locking circuit for relay ICI. When relay ICI operates, the upper winding of relay ISL is short circuited for effecting the operation of relay MG of the connector through the lower winding of relay ISL which may be 50 ohms for example.

Relay H is operated in the above described locking circuit for relay ICI for opening up the operating circuit for other ICI relays of the group to prevent the operation of other ICI relays while this particular intercept line circuit is functioning. Relay H also applies (+) to start conductor ST extending to the time release circuit for starting the timer to release the connection to this particular intercepted line circuit if the calling party does not hang up and release within a predetermined time, in a manner which will later be described.

With relay MG operated, as an indication that relay ICI is operated, and with relays RI and TT of the connector operated as an indication that the connector circuit is in ringing position, a circuit is closed for operating intercept access relay IA extending from (+), make contact of relay MG, conductor 11, make contact of relay RI, make contact of relay TT, conductor 12, upper winding of relay IA, break contact of relay IA, break contact of common intercept access relay CIA and resistor 3R to (−). Relay IA immediately closes a locking circuit for itself including its lower winding and at the same time closes an obvious operating circuit for relay CIA, relay CIA being bridged by resistor 4R to make this relay slow to release in order to hold off the closure of the operating circuit of other IA relays after this particular one is released. The operation of relay CIA opens up the operating circuit of all IA relays to prevent the operation of another one of these relays in the same group if another connector calls an intercepted line.

Since this call is marked as one to be intercepted, a circuit is now closed for operating intercept correspondence relay IC extending from (+), make contact of relay IA, conductor 13, break contact of relay C1, make contact of relay C2, conductor 2, jumper 2JM, make contact of relay ICI and winding of relay IC to (−). Relay IC closes a locking circuit for itself extending from (+) on conductor HG, make contact of relay H, make contact and winding of relay IC to (−). The operation of relay IC connects the neon or space discharge tube NT across the tip and ring conductors of the called line by way of make contacts of relay ICI for tripping the ring by operating relay TR of the connector. It will be understood that sufficient current flows through tube NT to operate relay TR from the superimposed generator source, but that this tube is an effective block to direct current flow through windings of relay AB, thus preventing the operation of this latter relay and preventing the reversal of current back to the calling line for preventing the collection of a coin or the metering operation on a call to an intercept station. The operation of relay TR short circuits and releases relay RI for extending the called line conductors back to the calling end of the circuit and for releasing relay TR in the previously described manner. The release of relay RI opens up and releases relay IA which in turn releases relay CIA, thus preparing the individual and common IA and CIA relays so that they may be operated from another connector. The calling party now hears the intercept tone over a circuit extending from the source of intercept tone, condenser C5, make contact of relay IC, make contact of relay ICI and back over the previously described circuit to the calling line.

When the calling party hangs up the receiver in response to hearing the intercept tone, relay CB is released for releasing relay SA and this relay opens up the (+) connection to the various holding circuits for releasing relays C2, 1TF, UC1, 2TF, TT, MG, ICI, ISL, H, IC and the cut off relay of the called line, thus placing the circuits in normal condition in readiness for use on another call.

In the event that the called party is slow to hang up and release the connection, the timer circuit (not shown) disconnects (+) potential from conductor HG after a predetermined time for releasing relays H, IC and ICI. This does not clear out the individual intercept line circuit but it clears out the common intercept circuit so that it will function on another call to another intercept line.

It will be seen that the operation of relay ICI connects the marking wires to relay IC to determine whether or not this latter relay will be operated. This relay will be operated to trip the ring and apply intercept tone to the calling line if there is a jumper at a point in the cross connecting rack which corresponds to the conductors 1 to 10 inclusive selected by the station selecting portion of the connector circuit. It will also be seen that the operation of relay MG in the connector marks the call as one to a line having an intercept line circuit connected thereto, but if relay MG is not operated, then the circuits are not complete for operating the IA and CIA relays, thus preventing tying up the common intercept circuit except on calls to lines which have an intercept line circuit equipment associated therewith.

Having described an intercept system as particularly adapted for selective type communication service in party line ringing systems, with the station selection being of the code ringing or harmonic ringing type, it is desired to have it understood that this form is selected to facilitate in the disclosure of the invention rather than to limit the number of forms which it may assume; and it is to be further understood that various modifications, adaptations and alterations may be applied to the specific form shown to meet the requirements of practice without in any manner departing from the spirit or scope of the invention except as limited by the appended claims. For example, since it is the matching or correspondence condition between the cross connection jumper and the position taken by the station selector of the connector that determines the response of the common intercept circuit, with the station signal which is applied to the called line having nothing to do with this response, any type of signaling can be used such as code, harmonic, pulsating or the like.

What I claim is:

1. In a telephone system, a calling line, a multi-party called line, a plurality of line connecting relays having access to said called line, a plurality of counting relays controlled in accordance with line and station digits transmitted over said calling line, means controlled by said counting relays for selectively operating said line connecting relays for connecting said calling line with said called line, a call intercepting circuit, a plurality of marking conductors corresponding to said stations on said called line, cross connecting means for connecting said call intercepting circuit to said called line, means controlled by said counting relays in response to said station digits for selecting said marking conductors, an intercept correspondence relay, cross connecting means for connecting any one of said marking conductors to said correspondence relay, and means controlled by a correspondence condition between the marking conductor selected by said counting relays and the marking conductor cross connected to said correspondence relay for intercepting a call to said called line.

2. In a telephone system, a calling line, a plurality of multi-party called lines, a plurality of line connecting relays having access to said called lines, a plurality of counting relays controlled in accordance with line and station digits transmitted over said calling line, means controlled by said counting relays for selectively operating said line connecting relays for connecting said calling line with any one of said called lines, a call intercepting circuit, a plurality of marking conductors corresponding to said stations on said called line, a cross connecting means for connecting said call intercepting circuit to said selected called line, means controlled by said counting relays in response to said station digits for selecting said marking conductors, an intercept correspondence relay, cross connecting means for connecting any one of said marking conductors to said correspondence relay, and means controlled by a correspondence condition between the marking conductor selected by said counting relays and the marking conductor cross connected to said correspondence relay for intercepting a call to said selected called line.

3. In a telephone system, a calling line, a multi-party called line, a plurality of line connecting relays having access to said called line, a plurality of counting relays controlled in accordance with line and station digits transmitted over said calling line, means controlled by said counting relays in response to said line digits for selectively operating said line connecting relays for connecting said calling line with said called line, a plurality of marking conductors corresponding to the stations on said called line, means controlled by said counting relays in response to said station digits for selecting said marking conductors, an intercept correspondence relay, means for connecting any one of said marking conductors to said correspondence relay, and means controlled by a correspondence condition between the marking conductor selected by said counting relays and the marking conductor connected to said correspondence relay for disconnecting the selected source of ringing current from said called line.

4. In a telephone system, a calling line, a multi-party called line, a plurality of line connecting relays having access to said called line, a plurality of counting relays controlled in accordance with line and station digits transmitted over said calling line, means controlled by said counting relays in response to said line digits for selectively operating said line connecting relays for connecting said calling line with said called line, a plurality of marking conductors corresponding to the stations on said called line, means controlled by said counting relays in response to said station digits for selecting said marking conductors, an intercept correspondence relay, means for connecting any one of said marking conductors to said correspondence relay, and means controlled by a correspondence condition between the marking conductor selected by said counting relays and the marking conductor connected to said correspondence relay for disconnecting the selected source of ringing current from said called line and for connecting an intercept tone to said calling line.

5. In a telephone system, a calling line, a multi-party called line, a plurality of line connecting relays having access to said called line, a plurality of counting relays controlled in accordance with line and station digits transmitted over said calling line, means including said counting relays and responsive to said line digits for selectively operating said line connecting relays whereby said calling line is connected with said called line, a plurality of marking conductors corresponding to the stations on said called line, means controlled by said counting relays in response to said station digits for selecting said marking conductors, an intercept correspondence relay, means for connecting any one of said marking conductors to said correspondence relay, means controlled by a correspondence condition between the marking conductor selected by said counting relays and the marking conductor cross connected to said correspondence relay for operating said correspondence relay, means controlled by the operation of said correspondence relay for disconnecting the selected source of ringing current from said called line and for indicating to the party on the calling line that the station selected by said station digit is unobtainable, and time release means for disconnecting the connected marking conductor from said correspondence relay.

6. In a telephone system; a calling line; a called party line; a plurality of line connecting relays having access to said called line; a plurality of counting relays controlled in accordance with line and station digits transmitted over said calling line; means controlled by said counting relays for selectively operating said line connecting relays for connecting said calling line with said called line; a call intercepting circuit; a plurality of marking conductors corresponding to said stations on said called line; cross connecting means for connecting said call intercepting circuit to said called line; means controlled by said counting relays in response to said station digits for selecting said marking conductors; an intercept correspondence relay; means associated with said call intercepting circuit for connecting any one of said marking conductors to said correspondence relay; means operative in response to a correspondence condition between the marking conductor selected by said counting relays and the marking conductor connected to said correspondence relay for disconnecting the source of ringing current connected to said called line, said last means including a space discharge tube.

ROY W. JONES.

REFERENCES CITED

The following references are of record in the file of this patent:

UNITED STATES PATENTS

| Number | Name | Date |
|---|---|---|
| 1,541,386 | Polinkowsky | June 9, 1925 |
| 1,648,031 | Ruggles | Nov. 8, 1927 |
| 1,941,085 | Hague | Dec. 26, 1933 |
| 2,023,239 | Ostline | Dec. 3, 1935 |
| 2,177,079 | Saunders | Oct. 24, 1939 |
| 2,241,158 | Powell | May 6, 1941 |
| 2,300,186 | Wallace | Oct. 27, 1942 |